Figure 1:
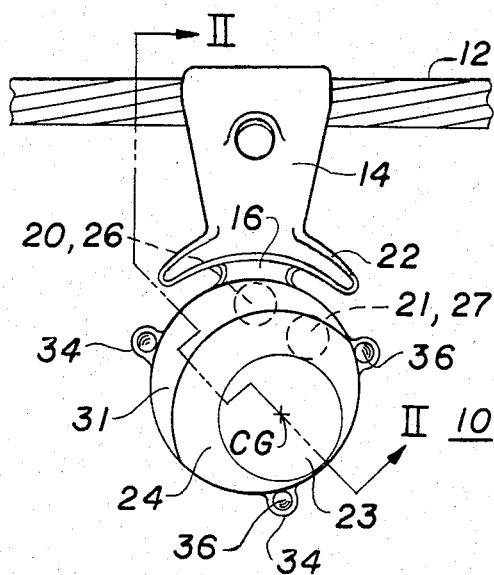

United States Patent

Hawkins et al.

[11] Patent Number: 4,527,008
[45] Date of Patent: Jul. 2, 1985

[54] VIBRATION DAMPER FOR OVERHEAD CONDUCTOR

[75] Inventors: Ronald G. Hawkins, Massena; Robert M. Hooker, Brushton, both of N.Y.

[73] Assignee: Aluminum Company of America, Pittsburgh, Pa.

[21] Appl. No.: 565,180

[22] Filed: Dec. 23, 1983

[51] Int. Cl.³ .............................................. H02G 7/14
[52] U.S. Cl. .................................... 174/42; 188/379
[58] Field of Search ................ 174/42; 188/266, 268, 188/378, 379; 267/136, 141, 141.1

[56] References Cited

U.S. PATENT DOCUMENTS 3,597,522  8/1971  Kobayashi ............................ 174/42
3,748,370  7/1973  Dalia .................................... 174/42

FOREIGN PATENT DOCUMENTS 567131  12/1958  Canada ................................ 174/42

Primary Examiner—Laramie E. Askin
Attorney, Agent, or Firm—Elroy Strickland

[57] ABSTRACT

A device for damping vibrations of an overhead conductor, the device including a member adapted to be clamped to the conductor. The member has a clamping portion for engaging the conductor and an arm portion extending from the clamping portion. Opposed sides of the arm portion have rounded depressions provided therein. Spherical elastomer damping elements have portions located respectively in the depressions. A weight member is disposed adjacent the opposed sides of the arm portion, the weight member having opposed depressions for holding portions of the damping elements that are opposite the portions located in the depressions of the arm portion.

8 Claims, 6 Drawing Figures

VIBRATION DAMPER FOR OVERHEAD CONDUCTOR

BACKGROUND OF THE INVENTION

The present invention relates generally to means for reducing and/or stopping the vibration occurring on spans of overhead conductors, and more particularly to a relatively small, lightweight and inexpensive seismic damping device for attachment to an overhead conductor to dampen vibration thereof.

Heretofore, the device that has been used extensively in damping the vibration of single overhead conductors has been the Stockbridge damper. As is well known, such a device employs a stranded steel cable supporting weights on opposed ends of the cable, the cable being connected to a conductor by way of clamping means. The Stockbridge damper uses friction among the strands of the cable to dissipate the energy of the wind received by the conductor in the form of heat. Three U.S. patents describing such dampers are U.S. Pat. Nos. 1,992,538 to Monroe et al, 2,058,173 to Noyes et al and 2,094,899 to MacIntyre.

A damping device employing two elastomer washers mounted between opposed inertial weights and a clamp arm is shown in U.S. Pat. No. 2,271,935 to Buchanan et al. The device is mounted on the conductor such that it extends horizontally from the conductor. The vertical motion of the conductor is converted to a twisting motion by the weights. Other motions of the weights appear to be precluded, as the elastomer washers are compressed into a space provided between the clamp arm and a bolt securing the weights to the arm.

U.S. Pat. No. 3,478,160 to Reed shows a damping device in which a weight is connected to a clamp arm via a single rubber bushing. The center of gravity of the weight is offset from the location of weight suspension, and the weight is nonsymmetrical about three mutually orthogonal plans, all passing through the center of gravity.

The washers and bushings of Buchanan et al and Reed function to dissipate the energy of conductor vibration by virtue of hysteresis losses in the elastomer material, as opposed to the sliding friction that takes place between adjacent metal strands in the Stockbridge damper.

BRIEF SUMMARY

The present invention is directed to a small, compact seismic damper. Such a damper, when clamped to the conductor to be damped, lies close to the conductor so that it is electrically shielded by the conductor. In this manner, the damper of the invention does not create corona problems when used under high voltage conditions. The compactness, as well as highly efficient damping, is provided by the use of small spherical or ball-shaped damping elements of solid elastomer material located between the arm of a structure for clamping to a conductor and a mass or weight means disposed on opposed sides of the clamp arm. The positions of the mass and elastomer spheres relative to the clamping structure are such that the mass is provided with at least three degrees of freedom relative to the clamp arm when the conductor vibrates. This allows damping at a variety of frequencies of conductor motion as aeolian vibration of a conductor occurs at different frequencies on different occasions because the frequency induced by the wind varies with the velocity of the wind.

The use of elastomer spheres as damping elements and rounded depressions in the clamp arm and weight in which the spheres are seated provide several additional advantages. For example, there are no stress concentrations on the spheres, as explained in detail hereinafter, that would reduce the fatigue life of the spheres under both static and dynamic conditions. The spheres are easily retained in the depressions without the use of adhesives and the labor involved in applying adhesives. The shape of a sphere is also conducive to isotropic (all direction) motion as discussed above. In addition, a sphere is easy to assemble with other components as it does not require indexing or aligning with rounded, spherical seats. Dimensional inspection of the spheres is made easy and inexpensive by use of two screens, one with a maximum allowable diameter for the sphere, and one with a minimum allowable diameter. Any sphere less than the maximum but greater than the minimum falls through the maximum screen but not the minimum screen. This sphere is then judged suitable in size. Any sphere falling through the smaller screen is considered too small. Such procedures eliminate the need to measure each sphere with a micrometer to determine size, and micrometer measurement is unreliable, as a micrometer squeezes the relatively soft material of the sphere in the process of measuring.

THE DRAWINGS

Figure 2:
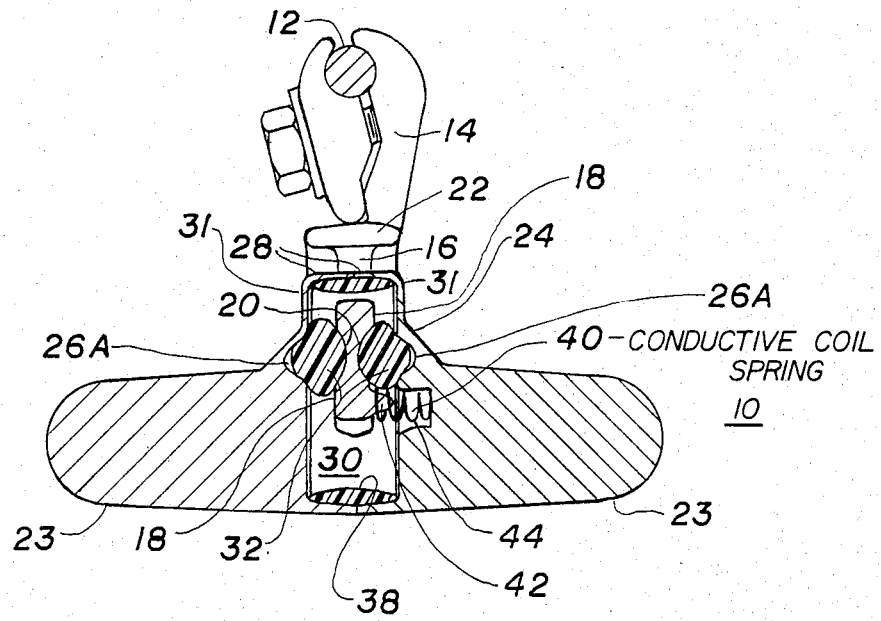
Figure 3:
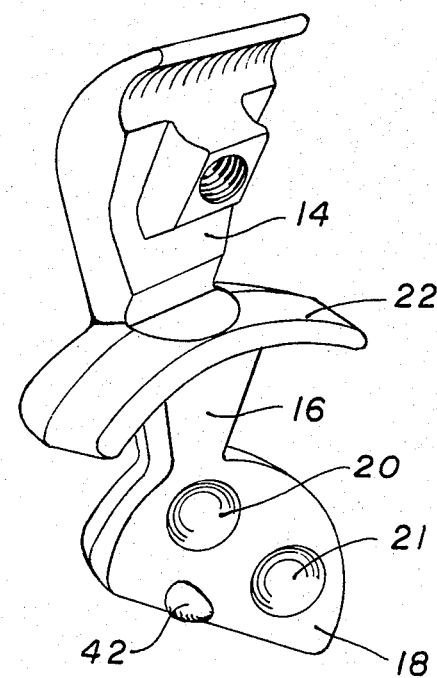
Figure 4:
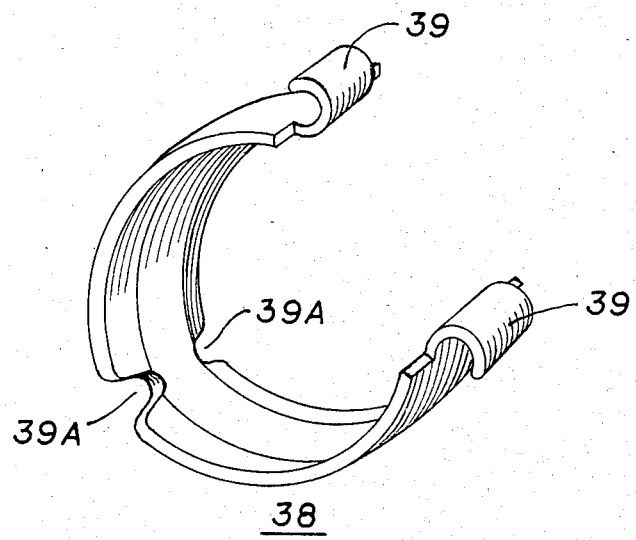
Figure 5:
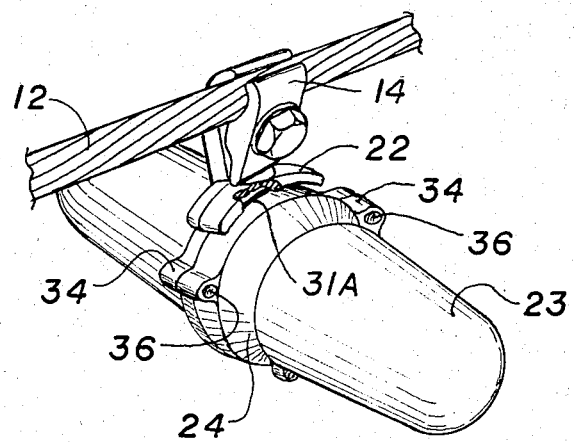
Figure 6:
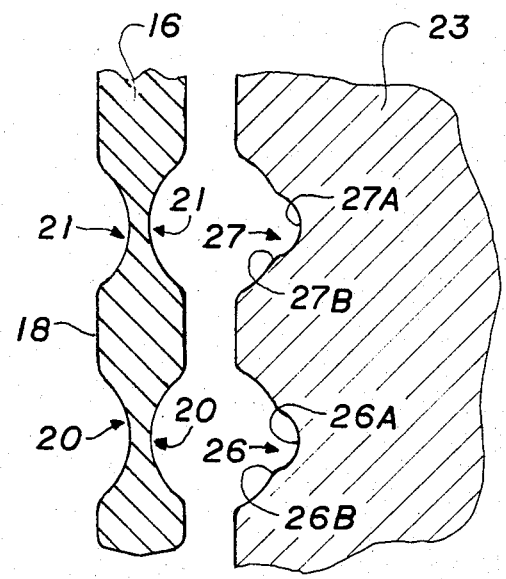

The invention, along with its objectives and advantages, will be better understood after consideration of the following detailed description and accompanying drawings in which:

FIG. 1 is an end elevation view of the damping device of the invention,

FIG. 2 is a sectional view of the damping device of FIG. 1 taken along lines II—II in FIG. 1, FIG. 3 is a perspective view of a member that, inter alia, clamps the damping device of the invention to an overhead conductor, FIG. 4 is a perspective view of an elastomer bumper employed in the device of the invention, FIG. 5 is a perspective view of the damping device of the invention shown attached to a stranded conductor, and FIG. 6 shows in partial section a clamp arm and weight member of the damping device.

PREFERRED EMBODIMENT

Referring now to the drawings, FIG. 1 thereof shows an end elevation view of the damper or damping device (10) of the invention mounted on a conductor 12 via a clamping member 14. The clamping member has an integral extension or arm 16, as best seen in FIGS. 3 and 6, that extends downwardly from the upper clamping portion of the member. The lower end of the extension or arm is enlarged (FIG. 3) to provide opposed surface areas 18 sufficient to accommodate two, spaced apart, spherical depressions or sockets 20 and 21 on each surface. In FIG. 3 only one face of surface 18 is shown so that only one set (20 and 21) of depressions is visible. In FIG. 6, however, both sides of the clamp arm are visible so that the depressions on both sides are visible.

Clamp 14 is also provided with a curved, integral shield structure 22 for purposes explained hereinafter.

On opposed sides of the clamp extension, i.e., opposed surfaces 18, is located a weight or mass structure 23. Weight 23 comprises two elongated weight halves having rounded ends and conical flanges 24 (intermediate the ends). Flanges 24 are provided with two spherical depressions 26 and 27 (FIG. 6) facing inwardly toward depressions 20 and 21 provided in clamp arm 16. When the weight halves are properly aligned, flange cones 24 are located in the positions shown in FIGS. 1 and 2 which locate the depressions 26 and 27 therein opposite to and in respective alignment with depressions 20 and 21 on both sides of the clamp arm. In FIG. 1, the aligned depressions are shown in dash outline; only two outlines are depicted, as the depressions in the clamp arm and weight halves are shown superposed.

As seen in FIG. 1, when the weight 23 is properly attached to clamp arm 16, the center of gravity CG of the weight is located a predetermined distance from the location of the depressions (and elastomer spheres discussed hereinafter). This distance provides a lever arm, the end of which contains the CG of the weight.

When mounted on a conductor (12) by clamp 14, the orientation of the elongated weight 23 is crosswise of the axis of the conductor.

As seen in section in FIG. 6 of the drawings, each of the depressions in the weight halves 23 comprises in effect two concentric, intersecting spherical sockets, the two sockets comprising a relatively large, outermost socket (26 and 27) and a small, innermost socket (26A and 27A). The intersecting sockets are provided with generous blend radii 26B and 27B extending between the two for purposes explained below.

Each of the weight halves 23 has a peripheral wall portion 28 that provides an enclosed space or chamber 30 between the two weight halves when placed together about clamp arm 16. The upper portions of walls 28 (FIG. 2) are located above conical sections 24 of the weights so that space 30 is extended somewhat in the direction of conductor clamp 14. The upper wall portions complete the enclosure of 30 by the joining conical sections 24 via vertical walls 31.

An opening 31A (visible in FIG. 5) is provided in the upper walls of 28 of the weight halves to allow the arm 16 of the conductor clamp to extend into space 30, as seen in FIG. 2.

Space 30 accommodates the lower part of clamp arm 16 and four spherical elastomer damping elements 32 located between the weight halves and clamp arm and in the respective sockets or depressions 20, 21, 26 and 27 provided in the weights and arm. Only two of the elements, however, are visible in FIG. 2. The four elements support the weight halves on the clamp arm when the device 10 is attached to an overhead conductor. A preferable material for the spheres is a pure (i.e., no additives) silicone gum.

In addition, each weight half 23 is provided with integral outwardly projecting ears or tabs 34 (FIGS. 1 and 5) that are employed to secure the halves together. Each ear can be provided with an opening through which a rivet 36 (FIG. 1) is inserted therethrough and secured. However, a preferable method of securing the weight halves together is to provide the ears 34 of one weight half with integral rivets (the ends of which are visible in FIGS. 1 and 5 and labeled 36 therein) and the ears of the other half with openings. The integral rivets extend toward the other weight half and ears as the weight halves are brought together and proceed through the openings provided in the other ears when the halves are brought together about clamp arm 16. If the weight halves are castings, the ears and rivets are provided in the casting process.

Within the chamber 30 (formed by the weight halves) is located an elastomer bumper 38, as shown in section in FIG. 2. As shown, the bumper is located against the inside surface of walls 28 of the weight 23. The bumper can be secured in place by providing the same with hook ends 39, as shown in FIG. 4, and hooking the ends over edges of walls 28 that are formed by the opening (not shown) in the walls that permits clamp arm 16 to extend into space 30. Bumper 38 is preferably constructed of a one-piece, relatively hard elastomer material that retains its shape. It requires no special care and is placed in space 30 when the damper is assembled.

In addition, a "weep hole" can be provided in the lower body portion of 38 to permit any moisture in space 30 to drain therefrom. The weep hole may comprise two slots 39A provided in opposed edges of the bumper structure, as shown in FIG. 4.

An open coil spring 40 is shown in FIG. 2 that maintains clamp 14 and weight 23 at the same electrical potential. A conical protrusion 42 is provided on one surface 18 of the clamp arm, and a recess 44 is provided in the weight half facing the protrusion to center and receive the spring when the device 10 is assembled.

The device 10 is assembled by placing spring 40 in recess 44 provided in the one weight half and the elastomer spheres 32 seated in the depressions 20 and 21 provided in the clamp arm; the weight halves are then brought together about the clamp arm and spheres. The depressions 26 and 27 in the weight halves align with the spheres, and protrusion 42 with spring 40, when the upper wall portions 28 of the weight halves are disposed about the clamp arm. Also, the ears 34 of one weight half align with the ears of the other weight half when wall portions 28 thereof are disposed around the clamp arm; rivets 36 of the one weight half enter the openings provided in the ears of the other weight half as the halves are brought together. The above components are then secured together by the rivets.

The elastomer spheres are now secured between the clamp arm and weight halves. The size of the spheres and the depths of the sockets or depressions are such that when the weight halves are secured together by rivets 36, the spheres are compressed and the weight halves and clamp arm are spaced apart by the distance of the compressed spheres. The larger, outermost socket provides a firm grip and a proper bearing surface for the elastomer of the sphere, while the small, inner sockets 26A and 27A provided in the respective bottoms of sockets 26 and 27 (of weight halves 23) provide a place and space for the material of the elastomer to flow and accumulate when commercial tolerances require such. In this manner, a proper amount of compression on spheres 32 is provided such that the spring constant of the spheres is maintained at a proper value to provide efficient damping by device 10.

For example, if spheres 32 are undercompressed, the result is a reduction in their outside diameters and a spring constant that is too soft such that the spheres do not provide a maximum damping capability. Overcompression, on the other hand, makes the spheres too stiff such that damping efficiency is again reduced. The spheres 32 suppress conductor vibration by absorbing and dissipating, by hysteresis losses in the form of heat, the energy of vibration at a rate greater than that at which the wind can supply energy to replace the dissipated energy.

As indicated earlier, there are generous blend radii 26B and 27B (FIG. 6) provided between the outer and inner sockets of the weight halves. Such radii allow the material of the elastomer spheres 32 to flow into the smaller socket while at the same time providing a smooth surface that does not present stress edges that would result in eventual fatigue of the spheres.

The right and left hand weight halves of the invention, with the wall portions 28, completely enclose the elastomer spheres and thereby protect the same from the degrading effects of ultraviolet radiation (from the sun) on the material of the spheres. Bumper 38 located inside space 30 also serves to keep sunlight from the interior of the space. And, adding further to the protection of the spheres is the integral curved shield 22 of the clamp. Shield 22 covers opening 31A in wall portions 28 through which the clamp arm extends.

The primary function of bumper 38, however, is to protect against any high amplitude motion of the conductor that might occur by cushioning the resulting impact between the clamp arm and weight structure. With normal aeolian vibration, the space of 30 is adequate for relative motion between the clamp arm and weight. High amplitude conductor motion, however, occurs when the conductor gallops due to an enlarged conductor diameter created by ice on the conductor. If motion limiting were not provided, fatigue damage to the spheres would soon occur.

The shape of the lower end of clamp arm 16 provides a mechanical interlock between bumper 38 and walls 28 of the weight structure 23 such that if spheres 32 should fail, the weight will not fall from the clamp body. In addition, with the weight attached to the clamp body, corona occurring about the lower end of the clamp arm is prevented.

The configurations of both the clamp 14 and the weight 23 are such that they are easily die cast to provide low manufacturing costs. The depressions or sockets provided in both the clamp arm and weight halves, the integral ears and rivets 34 and 36, the depression 44, projection 42 for spring 40 and sun shield 22 all have been provided by die casting.

Preferably, the material of the clamp arm 14 is light in weight in comparison to the material of the weight 23. A suitable material for the clamp arm is a strong aluminum alloy, while the material of the weight may be a zinc material that is easily die cast, though the invention is not limited thereto.

While the invention has been described in terms of preferred embodiments, the claims appended hereto are intended to encompass all embodiments which fall within the spirit of the invention.

What is claimed is:

1. A device for damping vibrations of an overhead conductor, comprising:
a member for clamping on the conductor,
a weight member attached to said clamping member,
opposed depressions provided in the clamping and weight members,
spherical damping elements made of elastomer material located in the depressions and secured between the weight and clamping members,
the depressions in at least said weight member each comprising a relatively small spherical socket intersecting a larger spherical socket at a location intermediate the inner and the outermost portions of the larger socket.

2. The damping device of claim 1 in which the material of the weight member adjacent the location of the intersecting spherical sockets is provided with a rounded surface that permits the material of the elastomer elements to flow into the smaller socket when the elements are compressed while simultaneously reducing stress concentration on the elements.

3. A device for damping vibrations of an overhead conductor, comprising:
a member adapted to be clamped to the conductor, said member having a clamping portion for engaging the conductor and an arm portion extending from the clamping portion, said arm portion having at least two depressions on opposed sides thereof,
at least four substantially spherical elastomer damping elements having portions located in the respective depressions provided in the arm portion of the clamping member, and
a weight member disposed adjacent the opposed sides of and connected to the arm portion of the clamping member by the damping elements, said weight member having opposed depressions holding portions of the damping elements that are opposite the portions located in the arm portion of the clamping member.

4. The damping device of claim 3 in which the weight member comprises two half portions connected together about the arm portion of the clamping member and the damping elements.

5. The damping device of claim 4 in which an elastomer bumper is located between and in engagement with the weight portions and extends about the area of the damping elements such that the damping elements are enclosed by the materials of the weight portions and bumper.

6. The damping device of claim 3 in which an open coil spring is located between the weight member and arm portion of the clamping member and positioned to make physical and electrical contact with the weight member and arm portion.

7. The damping device of claim 6 in which the arm portion of the clamping member is provided with a protrusion receiving one end of the coil spring.

8. A device for damping vibrations of an overhead conductor, comprising:
a member for clamping on the conductor,
elastomer damping elements, and
a weight member attached to the clamping member, said weight member having depressions therein seating the damping elements, said depressions each comprising an inner spherical socket and an outer spherical socket that are concentric with each other.

* * * * *